United States Patent
Puri et al.

(10) Patent No.: US 11,973,534 B2
(45) Date of Patent: Apr. 30, 2024

(54) DETERMINING ATTENUATION RATE USING IMAGERY

(71) Applicant: X Development LLC, Mountain View, CA (US)

(72) Inventors: Varun Puri, Los Altos, CA (US); Ozgun Bursalioglu Yilmaz, Palo Alto, CA (US)

(73) Assignee: X Development LLC, Moutain View, CA (US)

( * ) Notice: Subject to any disclaimer, the term of this patent is extended or adjusted under 35 U.S.C. 154(b) by 392 days.

(21) Appl. No.: 17/513,190

(22) Filed: Oct. 28, 2021

(65) Prior Publication Data
US 2023/0135206 A1 May 4, 2023

(51) Int. Cl.
| | |
|---|---|
| *H04B 10/00* | (2013.01) |
| *G06F 18/214* | (2023.01) |
| *G06N 3/08* | (2023.01) |
| *H04B 10/079* | (2013.01) |
| *H04B 10/112* | (2013.01) |
| *H04J 14/00* | (2006.01) |

(52) U.S. Cl.
CPC ....... *H04B 10/0795* (2013.01); *G06F 18/214* (2023.01); *G06N 3/08* (2013.01); *H04B 10/112* (2013.01)

(58) Field of Classification Search
CPC ... H04B 10/11; H04B 10/112; H04B 10/1121; H04B 10/1123; H04B 10/1125
See application file for complete search history.

(56) References Cited

U.S. PATENT DOCUMENTS

| | | |
|---|---|---|
| 2009/0252499 A1 | 10/2009 | Rotgaizer |
| 2022/0085878 A1* | 3/2022 | Li .................. G06F 18/2431 |

OTHER PUBLICATIONS

Li, Lun , et al., "Machine Learning Based tool Chain Solution for Free Space Optical Communication (FSOC) Propagation Modeling," 2021 IEEE Aerospace Conference, (5100) 2021, pp. 1-8.

(Continued)

*Primary Examiner* — Daniel G Dobson
(74) *Attorney, Agent, or Firm* — Botos Churchill IP Law LLP

(57) ABSTRACT

A method of operating a communication network includes training a neural network and implementing the neural network to determine link availability. Training the neural network includes receiving first images and signal visibility data for first locations for one or more first nodes in the communication network, generating training data based on the first images and the signal visibility data, and training the neural network using the training data to output an attenuation category related to attenuation rate of a link based on a training image and a timestamp for the training image. Implementing the neural network includes receiving second images for second locations for one or more second nodes in the communication network, determining link availability based on the second images and outputs from the neural network, and operating the communication network based on the link availability.

20 Claims, 5 Drawing Sheets

(56) References Cited

OTHER PUBLICATIONS

Pasupathi, T., et al., "Design, Testing and Performance Evaluation of Beam Positioning System for Free Space Optical Communication System", Dept. of Electronics and Communication Engineering, Kings College of Engineering, Radioengineering, vol. 30, No. 1, 2021, pp. 16-24.

International Search Report and Written Opinion for Application No. PCT/US2022/040066 dated Nov. 29, 2022 (18 pages).

Yang, Zeyuan, et al., "An Artificial Neural Network Based Attenuation Tomography in Free Space Optical Network", 2018 International Conference On Networking and Network Applications (NANA), IEEE, Oct. 12, 2018, pp. 52-57.

Yin, Xiaoli, et al., "Experimental Study of Atmospheric Turbulence Detection Using an Orbital Angular Momentum Beam Via a Convolutional Neural Network", IEEE Access, vol. 7, Dec. 2019, pp. 184235-184241, XP011763261, DOI: 10.1109/ACCESS.2019.2960544.

\* cited by examiner

DETERMINING ATTENUATION RATE USING IMAGERY

BACKGROUND

Communication terminals may transmit and receive optical signals through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

The optical link operations may vary physically due to environmental disturbances or differences in component operation over time. For example, environmental disturbances such as wind, rain, fog, or floating debris may cause attenuation of the optical link. Also, components may operate differently depending on temperature or wear over time.

BRIEF SUMMARY

Aspects of the disclosure provide for a method of operating a communication network that includes a plurality of nodes. The method includes receiving, by one or more processors, first images and signal visibility data for first locations for one or more first nodes of the plurality of nodes; generating, by the one or more processors, training data based on the first images and the signal visibility data; training, by the one or more processors, a neural network using the training data, the neural network being configured to receive a training image and a timestamp for the training image and to output an attenuation category related to attenuation rate of a link received by the one or more first nodes; receiving, by the one or more processors, second images for second locations for one or more second nodes of the plurality of nodes; determining, by the one or more processors, link availability based on the second images and outputs from the neural network; and operating, by the one or more processors, the communication network based on the link availability.

In one example, the one or more of the second locations are the same as one or more first locations. In another example, the attenuation category includes a good category and a poor category that are defined by one or more threshold attenuation rates. In this example, the good category is optionally defined as an attenuation rate of the link that is less than or equal to a threshold rate. Further in this example, the poor category is optionally defined as an attenuation rate of the link that is greater than the threshold rate. Alternatively in this example, the good category and the poor category are also defined by link distance, link operating conditions, and link operating constraints.

In a further example, the method also includes receiving, by the one or more processors, additional dynamic data for conditions at the second locations; wherein the determining of the link availability is further based on the additional dynamic data. In yet another example, the method also includes receiving, by the one or more processors, one or more third images from a candidate location for a new node; predicting, by the one or more processors, link performance at the candidate location using outputs from the neural network using the one or more third images as input; and determining, by the one or more processors, link availability for the candidate location based on the predicted link performance. In this example, the method also includes determining, by the one or more processors, the candidate location for the new node based on predicted availability of internet access at the candidate location.

Other aspects of the disclosure provide for a network controller for a plurality of nodes in a communication network. The network controller includes a communications system configured to communicate with the plurality of nodes, and one or more processors. The one or more processors are configured to receive one or more images for locations of interest for a communication link in the communication network; implement a neural network to obtain an attenuation category for each of the one or more images, the neural network being trained to receive images and output an attenuation category related to attenuation rate of a link received at the locations of interest associated with the images; determine link availability at the locations of interest based on the one or more images and outputs from the neural network; and operate the communication network based on the link availability.

In one example, the network controller also includes the neural network. In another example, the attenuation category includes a good category and a poor category that are defined by one or more threshold attenuation rates. In this example, the good category is optionally defined as an attenuation rate of the link that is less than or equal to a threshold rate. Further in this example, the poor category is optionally defined as an attenuation rate of the link that is greater than the threshold rate. Alternatively in this example, the good category and the poor category are also optionally defined by link distance, link operating conditions, and link operating constraints.

In a further example, the one or more processors are also configured to receive additional dynamic data for conditions at the locations of interest; wherein the link availability is determined further based on the additional dynamic data. In yet another example, the one or more processors are also configured to receive one or more second images from a candidate location for a new node; predict link performance at the candidate location using outputs from the neural network using the one or more second images as input; and determine link availability for the candidate location based on the predicted link performance. In this example, the one or more processors are also configured to determine the candidate location for the new node based on predicted availability of internet access at the candidate location.

Further aspects of the disclosure provide for a non-transitory, tangible computer-readable storage medium on which computer readable instructions of a program are stored. The instructions, when executed by one or more processors of a network controller, cause the one or more processors to perform a method. The method includes receiving one or more images for locations of interest for a communication link in a communication network; implementing a neural network to obtain an attenuation category for each of the one or more images, the neural network being trained to receive images and output an attenuation category related to attenuation rate of a link received at the locations of interest associated with the images; determining link availability at the locations of interest based on the one or more images and outputs from the neural network; and operating the communication network based on the link availability.

In one example, the method also includes receiving training images and signal visibility data for locations of one or more nodes in the communication network; generating training data based on the training images and the signal visibility data; and training a neural network using the training data, the neural network being configured to receive a training image and a timestamp for the training image and to output an attenuation category related to attenuation rate of a link received by the one or more nodes.

DETAILED DESCRIPTION

Overview

Figure 1:
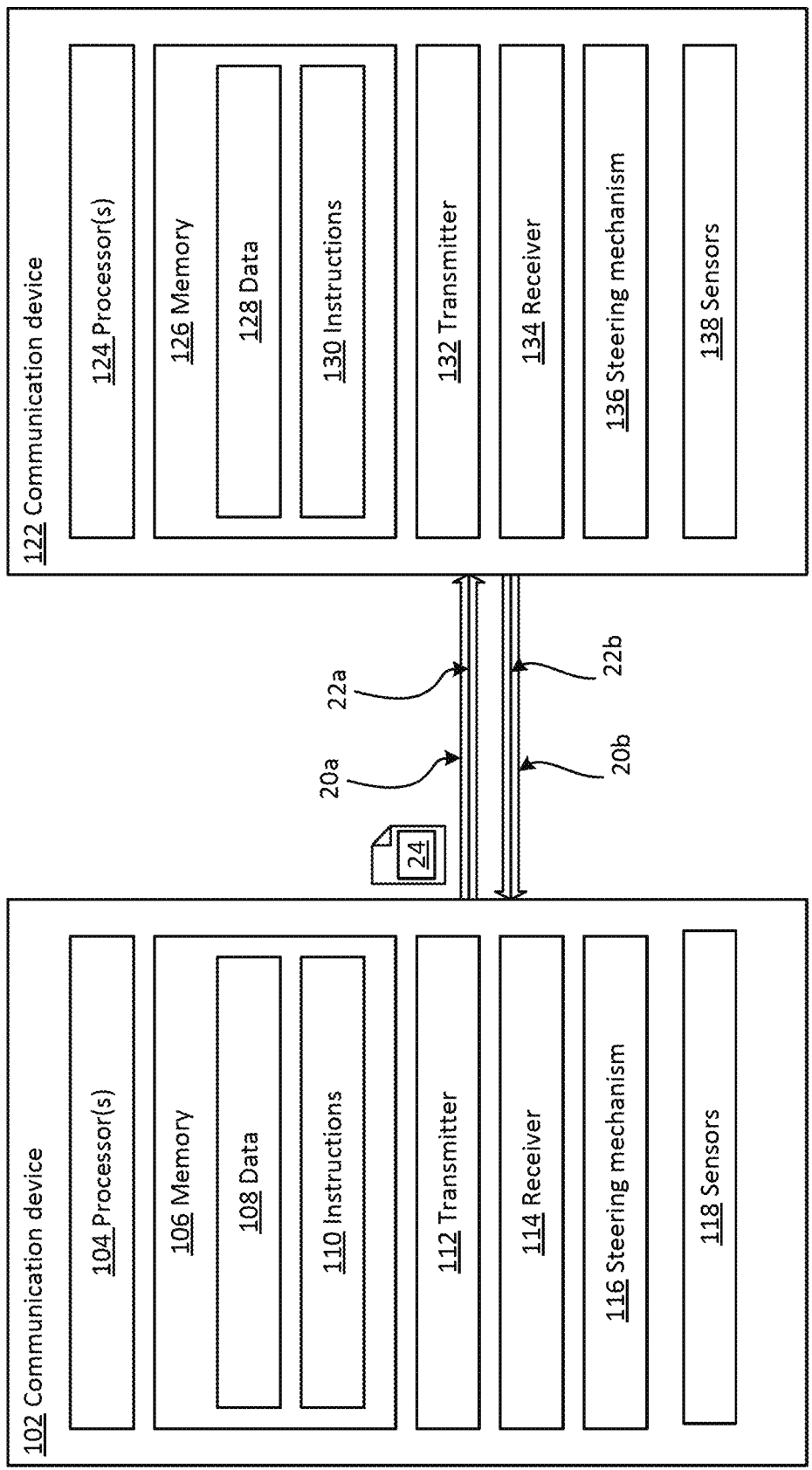
FIG. 1 is a block diagram 100 of a first communication device and a second communication device in accordance with aspects of the disclosure.

The technology is related to a method of determining attenuation of a free-space optical communications (FSOC) link for a given location. Visibility at a location can be used as a predictor for how attenuation and performance of an FSOC link may be at the location. However, shipping and installing visibility sensors at every desired location may not be financially or logistically feasible. The technology described herein includes gathering visibility data from FSOC terminal camera images (if available) or from off-the-shelf cameras, such as Ubiquiti G3, placed adjacent to terminals. The collected visibility data may be used as input to a machine learning system to predict attenuation rate or other performance metrics of an FSOC link for different time frames. The predicted performance metrics may be used to determine the expected availability of the FSOC links.

Each node of a network may be capable of forming a plurality of communication links by pointing transceivers at each node to one or more other transceivers in the network, thereby forming a line-of-sight communication link. The performance of a given link in the network may be based on conditions at the locations of the first and/or second node. For example, fog or other atmospheric disturbances that affect line of sight may cause attenuation or otherwise block the link.

A network controller may be configured to communicate with the nodes of the network and transmit instructions to each of the nodes. The network controller may be configured to determine link availability using machine learning techniques. The link availability may be used to determine which routing paths are best for transmission of data through the network.

Determining the link availability may include the following steps: identifying locations of interest for retrieving signal visibility data, such as from visibility sensors, existing FSOC terminals, or a scintillometer, installing cameras where there is no existing means of capturing images at the location, receiving images and signal visibility data for each of the locations, calculating a signal attenuation metric associated with a given link using the signal visibility data, creating a training data set by associating the signal attenuation metric of the given link with one or more images associated with a location of a receiving node of the given link, training a neural network using the training data for receiving signal attenuation metric and the associated one or more images and timestamps as inputs and providing attenuation categories as outputs, implementing the trained neural network to evaluate new images, and determining link availability based on the attenuation category. After determining the link availability, the network controller may send instructions to the nodes of the FSOC network to improve network performance.

The technology herein provides a way to gauge availability of an FSOC link at a location. The described method can be performed using existing cameras or off-the-shelf products, which may keep costs lower. In addition, the method may allow for more accurate predictions of latencies of links in an FSOC network and better plans to compensate for the latencies. As a result, the FSOC network may have increased speed and efficiency overall.

Example Systems

FIG. 1 is a block diagram 100 of a first communication device 102 of a first communication terminal configured to form one or more links with a second communication device 122 of a second communication terminal, for instance as part of a system such as a free-space optical communication (FSOC) system. For example, the first communication device 102 includes as components one or more processors 104, a memory 106, a transmitter 112, a receiver 114, a steering mechanism 116, and one or more sensors 118. The first communication device 102 may include other components not shown in FIG. 1.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information may be stored, such as one or more offsets determined for tracking a signal.

Data 108 may be retrieved, stored or modified by the one or more processors 104 in accordance with the instructions 110. For instance, although the technology is not limited by any particular data structure, the data 108 may be stored in computer registers, in a relational database as a table having a plurality of different fields and records, XML documents or flat files.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 are in communication with the transmitter 112 and the receiver 114. Transmitter 112 and receiver 114 may be part of a transceiver arrangement in the first communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

The transmitter 112 may include an optical transmitter, an amplifier, and an attenuator. In addition, as shown in FIG. 1, the transmitter 112 may be configured to output a beacon beam 20 that allows one communication device to locate another, as well as a communication signal over a communication link 22. The output signal from the transmitter 112 may therefore include the beacon beam 20, the communication signal, or both. The communication signal may be a signal configured to travel through free space, such as, for example, a radio-frequency signal or optical signal. In some cases, the transmitter includes a separate beacon transmitter configured to transmit the beacon beam and one or more communication link transmitters configured to transmit the optical communication beam. Alternatively, the transmitter 112 may include one transmitter configured to output both the beacon beam and the communication signal. The beacon beam 20 may illuminate a larger solid angle in space than the optical communication beam used in the communication link 22, allowing a communication device that receives the beacon beam to better locate the beacon beam. For example, the beacon beam carrying a beacon signal may cover an angular area on the order of a square milliradian, and the optical communication beam carrying a communication signal may cover an angular area on the order of a hundredth of a square milliradian.

As shown in FIG. 1, the transmitter 112 of the first communication device 102 is configured to output a beacon beam 20a to establish a communication link 22a with the second communication device 122, which receives the beacon beam 20a. The first communication device 102 may align the beacon beam 20a co-linearly with the optical communication beam (not shown) that has a narrower solid angle than the beacon beam 20a and carries a communication signal 24. As such, when the second communication device 122 receives the beacon beam 20a, the second communication device 122 may establish a line-of-sight link with the first communication device 102 or otherwise align with the first communication device. As a result, the communication link 22a that allows for the transmission of the optical communication beam (not shown) from the first communication device 102 to the second communication device 122 may be established.

The receiver 114 includes a tracking system configured to detect an optical signal. The receiver 114 is able to track the received optical signal, which may be used to direct the steering mechanism 116 to counteract disturbances due to scintillation and/or platform motion.

Returning to FIG. 1, the one or more processors 104 are in communication with the steering mechanism 116 for adjusting the pointing direction of the transmitter 112, receiver 114, and/or optical signal. The steering mechanism 116 may include one or more mirrors that steer an optical signal through the fixed lenses and/or a gimbal configured to move the transmitter 112 and/or the receiver 114 with respect to the communication device. In particular, the steering mechanism 116 may be a MEMS 2-axis mirror, 2-axis voice coil mirror, or piezo electronic 2-axis mirror. The steering mechanism 116 may be configured to steer the transmitter, receiver, and/or optical signal in at least two degrees of freedom, such as, for example, yaw and pitch. The adjustments to the pointing direction may be made to acquire a communication link, such as communication link 22, between the first communication device 102 and the second communication device 122. To perform a search for a communication link, the one or more processors 104 may be configured use the steering mechanism 116 to point the transmitter 112 and/or the receiver 114 in a series of varying directions until a communication link is acquired. In addition, the adjustments may optimize transmission of light from the transmitter 112 and/or reception of light at the receiver 114.

The one or more processors 104 are also in communication with the one or more sensors 118. The one or more sensors 118, or estimators, may be configured to monitor a state of the first communication device 102. The one or more sensors may include an inertial measurement unit (IMU), encoders, accelerometers, or gyroscopes and may include one or more sensors configured to measure one or more of pose, angle, velocity, torques, as well as other forces. In addition, the one or more sensors 118 may include one or more sensors configured to measure one or more environmental conditions such as, for example, temperature, wind, radiation, precipitation, humidity, etc. In this regard, the one or more sensors 118 may include thermometers, barometers, hygrometers, etc. While the one or more sensors 118 are depicted in FIG. 1 as being in the same block as the other components of the first communication device 102, in some implementations, some or all of the one or more sensors may be separate and remote from the first communication device 102.

The second communication device 122 includes one or more processors 124, a memory 126, a transmitter 132, a receiver 134, a steering mechanism 136, and one or more sensors 138. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may include an optical transmitter, an amplifier, and an attenuator. Additionally, as shown in FIG. 1, transmitter 132 may be configured to output both an optical communication beam and a beacon beam. For example, transmitter 132 of the second communication device 122 may output a beacon beam 20b to establish a communication link 22b with the first communication device 102, which receives the beacon beam 20b. The second communication device 122 may align the beacon beam 20b co-linearly with the optical communication beam (not shown) that has a narrower solid angle than the beacon beam and carries another communication signal. As such, when the first communication device 102 receives the beacon beam 20a, the first communication device 102 may establish a line-of-sight with the second communication device 122 or otherwise align with the second communication device. As a result, the communication link 22b, that allows for the transmission of the optical communication beam (not shown) from the second communication device 122 to the first communication device 102, may be established.

Like the receiver 114, the receiver 134 includes a tracking system configured to detect an optical signal as described above with respect to receiver 114. The receiver 134 is able to track the received optical signal, which may be used to direct the steering mechanism 136 to counteract disturbances due to scintillation and/or platform motion.

Returning to FIG. 1, the one or more processors 124 are in communication with the steering mechanism 136 for adjusting the pointing direction of the transmitter 132, receiver 134, and/or optical signal, as described above with respect to the steering mechanism 116. The adjustments to the pointing direction may be made to establish acquisition and connection link, such as communication link 22, between the first communication device 102 and the second communication device 122. In addition, the one or more processors 124 are in communication with the one or more sensors 138 as described above with respect to the one or more sensors 118. The one or more sensors 138 may be configured to monitor a state of the second communication device 122 in a same or similar manner that the one or more sensors 118 are configured to monitor the state of the first communication device 102.

As shown in FIG. 1, the communication links 22a and 22b may be formed between the first communication device 102 and the second communication device 122 when the transmitters and receivers of the first and second communication devices are aligned, or in a linked pointing direction. Using the communication link 22a, the one or more processors 104 can send communication signals to the second communication device 122. Using the communication link 22b, the one or more processors 124 can send communication signals to the first communication device 102. In some examples, it is sufficient to establish one communication link 22 between the first and second communication devices 102, 122, which allows for the bi-directional transmission of data between the two devices. The communication links 22 in these examples are FSOC links. In other implementations, one or more of the communication links 22 may be radio-frequency communication links or other type of communication link capable of travelling through free space.

Figure 2:
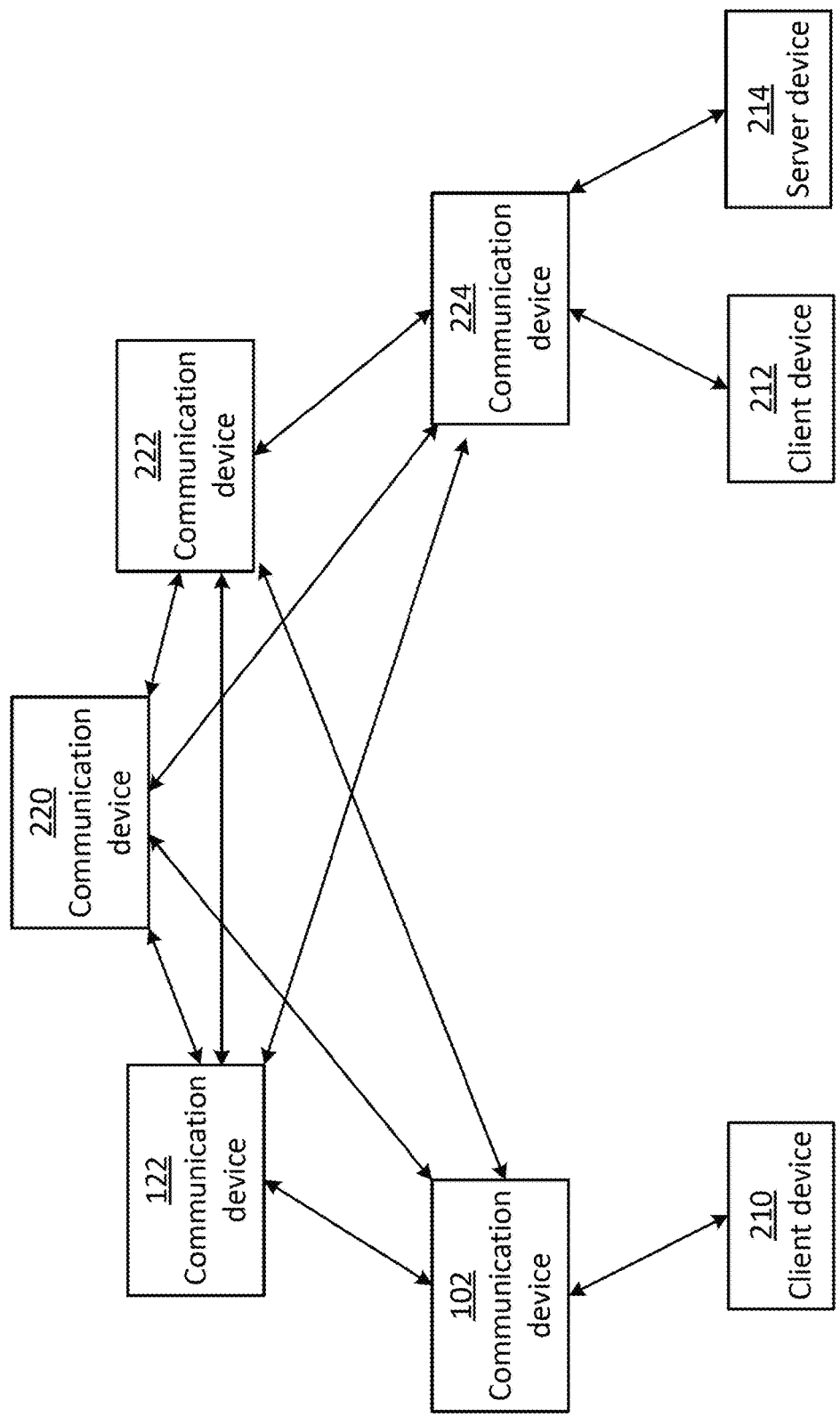
FIG. 2 is a pictorial diagram of a network 200 in accordance with aspects of the disclosure.

As shown in FIG. 2, a plurality of communication devices, such as the first communication device 102 and the second communication device 122, may be configured to form a plurality of communication links (illustrated as arrows) between a plurality of communication terminals, thereby forming a network 300. The network 200 may include client devices 210 and 212, server device 214, and communication devices 102, 122, 220, 222, and 224. Each of the client devices 210, 212, server device 214, and communication devices 220, 222, and 224 may include one or more processors, a memory, a transmitter, a receiver, and a steering mechanism similar to those described above.

Using the transmitter and the receiver, each communication device in network 200 may form at least one communication link with another communication device, as shown by the arrows. The communication links may be for optical frequencies, radio frequencies, other frequencies, or a combination of different frequency bands. In FIG. 2, the communication device 102 is shown having communication links with client device 210 and communication devices 122, 220, and 222. The communication device 122 is shown having communication links with communication devices 102, 220, 222, and 224.

The network 200 as shown in FIG. 2 is illustrative only, and in some implementations the network 200 may include additional or different communication terminals. The network 200 may be a terrestrial network where the plurality of communication devices is on a plurality of ground communication terminals. In other implementations, the network 200 may include one or more high-altitude platforms (HAPs), which may be balloons, blimps or other dirigibles, airplanes, unmanned aerial vehicles (UAVs), satellites, or any other form of high-altitude platform, or other types of moveable or stationary communication terminals. In some implementations, the network 200 may serve as an access network for client devices such as cellular phones, laptop computers, desktop computers, wearable devices, or tablet computers. The network 200 also may be connected to a larger network, such as the Internet, and may be configured to provide a client device with access to resources stored on or provided through the larger computer network.

Figure 3:
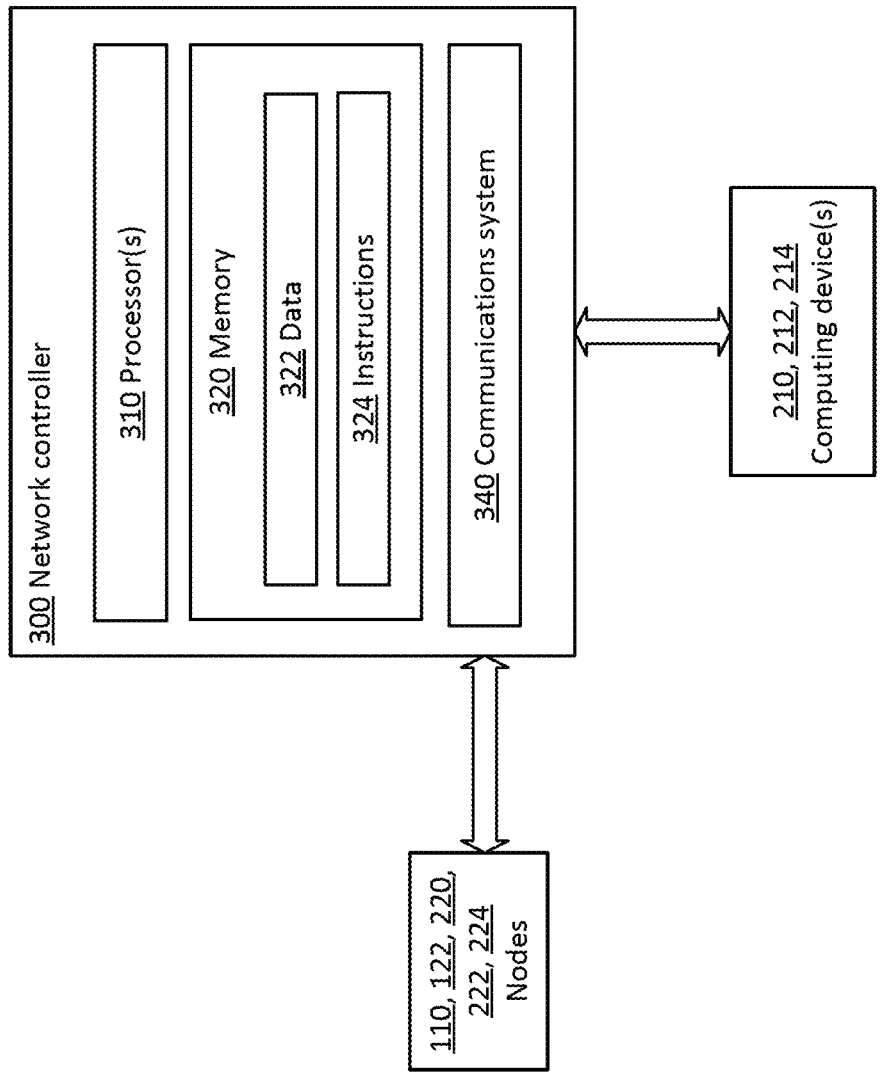
FIG. 3 is a block diagram of a network controller 300 in accordance with aspects of the disclosure.

In some implementations, the network 200 may be controlled overall by a network controller, such as network controller 300 depicted in FIG. 3. The network controller 300 may be located at one of the network nodes or at a separate platform, such as, for example, in a datacenter. The nodes of the network, including nodes 102, 122, 220, 222, 224 may be configured to communicate with one another, as described above and describe further herein. Depending on availability of the nodes, which may change as visibility conditions change, some network links may become infeasible or may fail. Thus, the configuration of the network may require regular (i.e., periodic) or irregular reconfiguration using the network controller 300 to maintain connectivity and to satisfy determined network flows. The network controller 300 may be configured to send control messages to the nodes of the network to pass routing information and/or to schedule reconfigurations to transmit client data.

As shown in FIG. 3, the network controller 300 may include one or more processors 310, memory, 320, and communications system 340. The one or more processors 310 may be similar to the one or more processors 104 described above. Memory 320 may store information accessible by the one or more processors 310, including data 322 and instructions 324 that may be executed by processor 310. Memory 320, data 322, and instructions 324 may be configured similarly to memory 106, data 108 and instructions 110 described above. The data 322 may include a table or other format representing all of the available nodes and possible links in the network 200 at a given time or time frame. The instructions 324 may include one or more modules for managing topology and routing, determining topology, determining network flows, solving for network configurations, or scheduling future network configurations. The communications system 340 may be configured to communicate with the nodes of network, such as nodes 110, 122, 220, 222, 224, as well as one or more computing devices, such as client devices 210, 212 and server device 214. The communication system 340 may optionally or alternatively be configured to transmit and receive a signal via radio frequencies, optical frequencies, optical fiber, cable, or other communication means to and from the nodes in the network and the one or more client devices.

Example Methods

Figure 4:
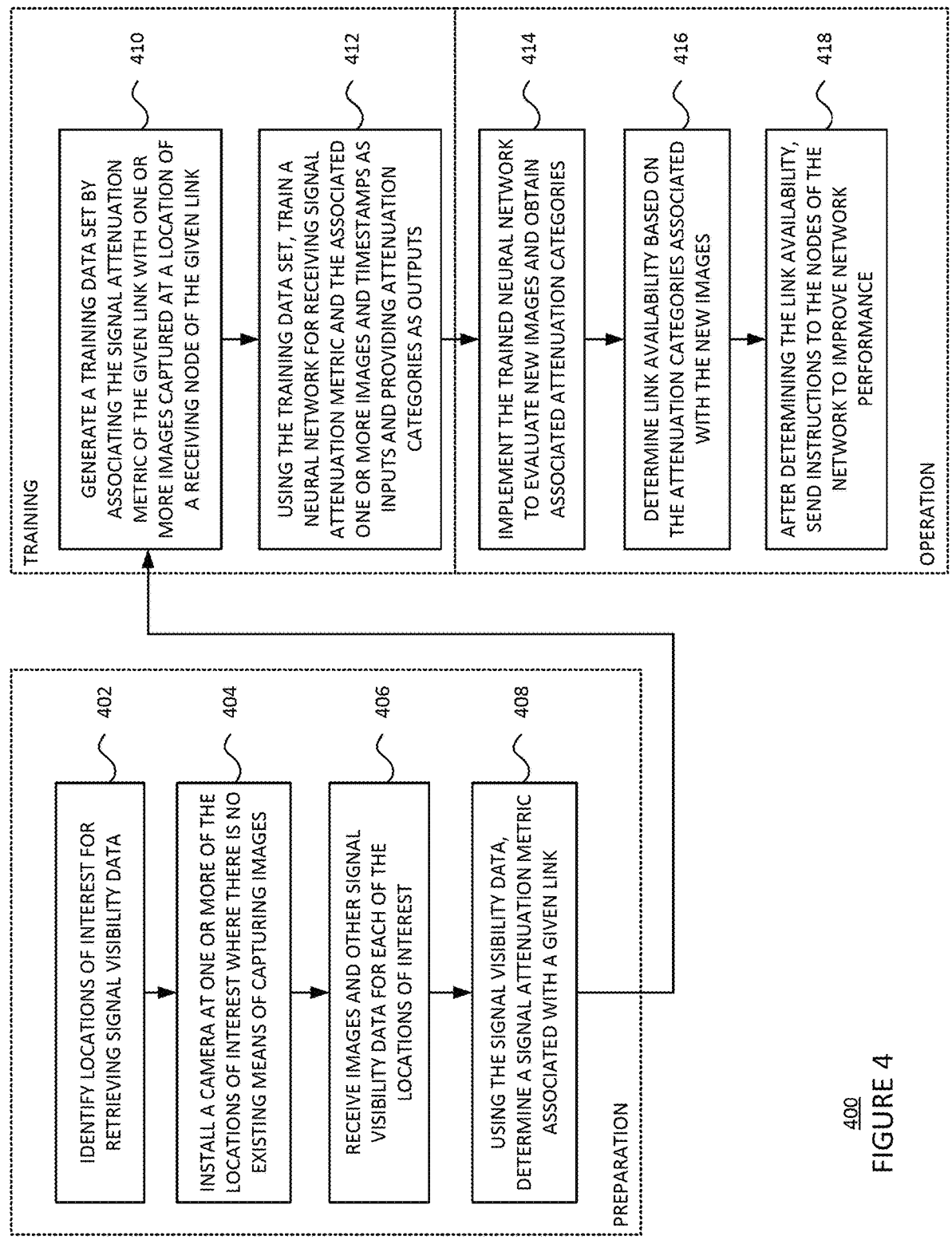
FIG. 4 is a flow diagram 400 depicting a method in accordance with aspects of the disclosure.

In operation, one or more processors may determine link availability at a given location for optical communication in a network. In FIG. 4, flow diagram 400 is shown in accordance with aspects of the disclosure that may be performed by the one or more processors 310 of network controller 300 and/or one or more processors of another computing device, such as those of server device 214. In particular, the flow diagram 400 shows a preparation stage for collecting and preparing data, a training stage for training a neural network using the data, and an operation stage for implementing the neural network in a communication network. The stages may be separated into different modules or may be part of the same module. The stages may be performed by the same or different set of processors. While FIG. 4 shows blocks in a particular order and stage, as well as stages in a particular order, the order of either blocks or stages may be varied, and multiple operations may be performed simultaneously. Also, operations may be added or omitted.

Figure 5:
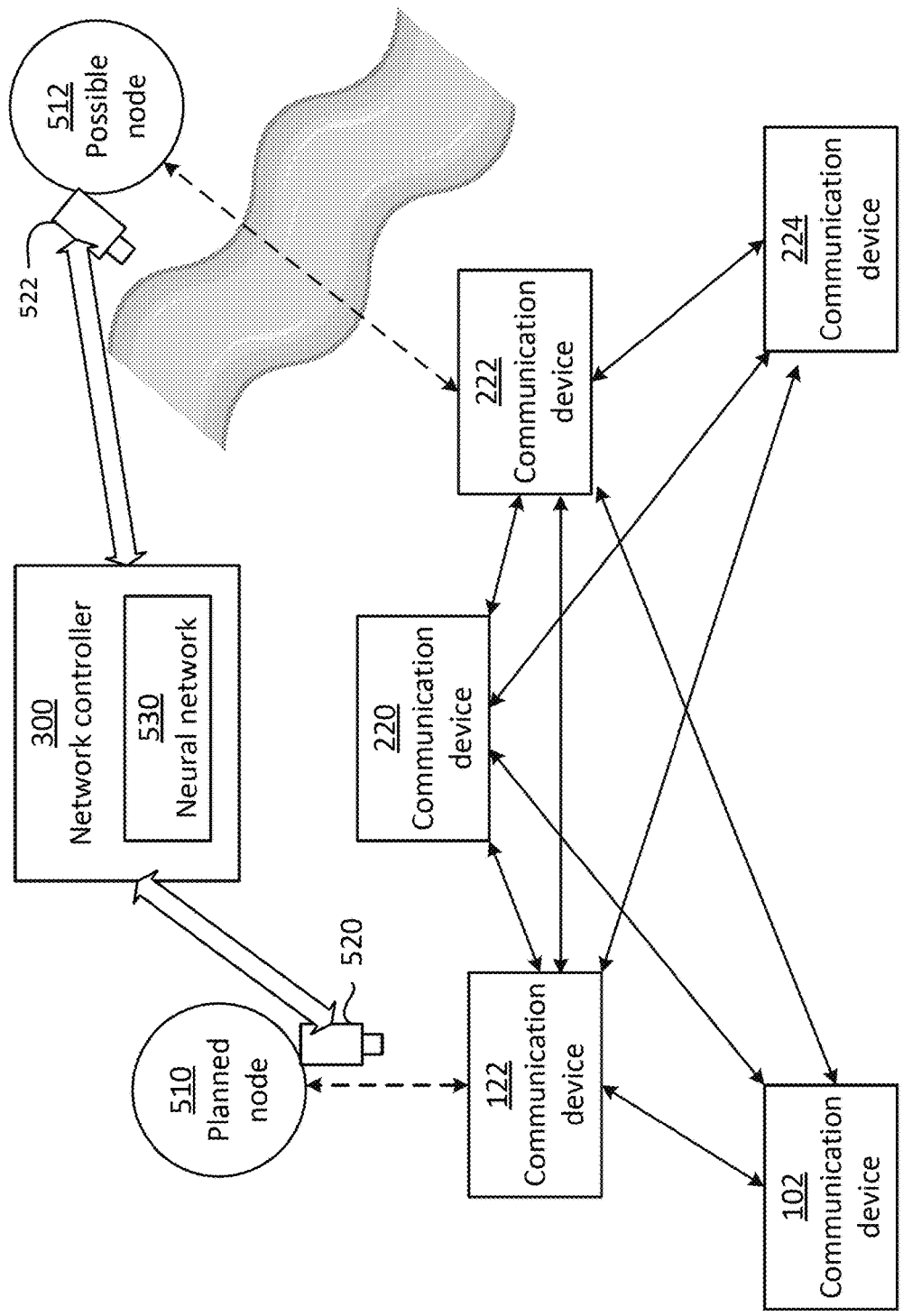
FIG. 5 is a pictorial diagram of a network 500 in accordance with aspects of the disclosure.

At block 402, locations of interest for retrieving signal visibility data may be identified. In some implementations, the one or more processors 310 or other processor in a computing device may identify the locations of interest based on a set of criteria. The locations of interest may correspond to where nodes of the network are candidate locations for nodes. The candidate locations may be planned node locations or locations where nodes can possibly be installed based on features of the locations. Possible node installation locations may include areas where internet access is limited or unavailable based on location characteristics or known fiber network locations. For example, a possible node installation location may be identified when it is separated from a more populous or metropolitan area by a body of water, when it is a threshold distance away from a more populous or metropolitan area, or when it is not included in the known fiber network locations. As shown in FIG. 5, locations of interest may be identified as existing nodes of network 200 (communication devices 102, 122, 220, 222, 224), a planned node location 510, and a possible node location 512. The possible node location 512 may be separated by a body of water from the area where network 200 is.

At block 404, a camera may be installed at one or more of the locations of interest where there is no existing means of capturing images. When an existing node may include built-in image capture means, no camera needs to be installed. In addition, for training a neural network, a minimum number of cameras associated with existing node locations may be needed. The minimum number of cameras may be one camera or more. Additional cameras beyond the minimum number of cameras may be installed or used for the training, but are not required. In FIG. 5, all existing image capture means may be included in the communication devices 102, 122, 220, 222, 224. In this case, cameras 520, 522 may be installed at planned node location 510 and possible node location 512, respectively.

At block 406, images and other signal visibility data for each of the locations of interest may be received by one or more processors, such as one or more processors 310 of network controller 300. The images may be received from the installed cameras and/or nodes having built-in cameras. In some examples, the images may be pre-processed for input into a neural network, such as rescaling, resizing, cropping, etc. The neural network may be part of the network controller 300, such as neural network 530 in FIG. 5, or may be a different computing device that communicates with the network controller 300, such as server device 214. Target image size may be, for example, 224p×224p. The signal visibility data may be received from each node, such as received power at the node and/or transmit power corresponding to each received power. In some examples, the received signal visibility data is collected over a timeframe, such as 300 seconds or other timeframe, and averaged over the timeframe.

At block 408, using the signal visibility data, determining a signal attenuation metric associated with a given link. For example, the signal attenuation metric may include a telemetry attenuation rate that is calculated as the difference between the transmit power and the corresponding receive power over the distance of the link, or $(tx-rx)/d$.

At block 410, a training data set may be generated by associating the signal attenuation metric of the given link with one or more images captured at a location of a receiving node of the given link. In some other examples, the signal attenuation metric of the given link may be associated with one or more images captured at a location of the transmitting node of the given link. The association may be based on a timestamp of the one or more images being within the timeframe for the signal attenuation metric. For example, an image captured at the location of node 102 at 0700 by a camera pointed in a general direction of node 122 may be associated with a signal attenuation metric calculated for link between nodes 102 and 122 over the timeframe 0700-0705.

At block 412, using the training data set, a neural network may be trained for receiving signal attenuation metric and the associated one or more images and timestamps as inputs and providing attenuation categories as outputs. As described above, the neural network may be part of the network controller 300, such as neural network 530, or may be a different computing device that communicates with the network controller 300, such as server device 214. The attenuation categories may include "good" and "poor." Good may correspond to an attenuation rate less than or equal to a threshold rate, and poor may correspond to an attenuation rate greater than the threshold rate. For example, the threshold rate may be 2.3 dB/km or more or less. The threshold rate may vary from link to link within the same network, therefore attenuation categories may vary from link to link as well. For example, the threshold rate for a given link may be based on link distance, link operating conditions, and/or link operating constraints.

Training the neural network may include receiving the images and timestamps from the training data set, outputting attenuation categories, and validating results the outputted attenuation categories using the associated signal attenuation metrics. In this way, the neural network may be trained to receive images and timestamps as input and output an attenuation category for each image and timestamp set. In other implementations, the neural network may be trained to receive images only, without timestamps, as input and output an attenuation category for each image. In further implementations, the neural network may also receive additional input data from sensors or other sources as training data and/or input. The additional data may include link distance, static link operating conditions, static link operating constraints, or other static measurements. In some cases, the additional input data may include dynamic link operating conditions, dynamic link operating constraints, wind data, temperature data, humidity data, or other dynamic measurements, along with corresponding timestamps. The additional input data that is static or timestamped at around the timestamp of an image may be associated with the image or the output attenuation category for the image. Validating the results of the outputted attenuation categories may include checking that the signal attenuation metric associated with an output attenuation category matches the definition of that attenuation category. The attenuation category may be defined by one or more threshold rates. In some examples, the attenuation category may further be defined based on link distances, link operating conditions, or link operating constraints.

At block 414, the trained neural network may be implemented to evaluate new images. The new images may be received from the installed cameras or the image capture means at nodes. Each new image is input into the trained neural network with its timestamp, and an attenuation category for each new image is output by the trained neural network. Alternatively, the new image is input without its timestamp, and an attenuation category is output by the trained neural network. In other alternative implementations, additional data from sensors or other sources may also be received by the trained neural network, such as wind data, temperature data, humidity data, link distance, link operating conditions, or link operating constraints. When the neural network is a separate computing device than the network controller 300, outputting the attenuation category may include sending the attenuation category and an indication of association with a given image or location to the network controller 300.

At block 416, link availability may be determined by the one or more processors 310 based on the attenuation category. For example, when the attenuation category associated with a given receiving location is good, the link received at the given receiving location is determined as available. When the attenuation category associated with the given receiving location is poor, the link received at the given receiving location is determined as unavailable. In other implementations, the determination of link availability may be additionally or alternatively determined based on the attenuation category and its association with a given transmitting location. Alternatively, the neural network may be trained and implemented to output link availability in addition to or instead of the attenuation category.

In some implementations, the link availability may be determined based on additional information, in addition to the collected image(s) for the location. The additional information may include current weather (including wind), weather forecasts (including wind forecasts), time of day, day or month of the year, season, historical data, region characteristics, etc. The additional information may be included in the training data for the neural network, such as at blocks 410 or 412, or may be factored with the attenuation category for determining link availability, such as at block 414 or 416.

At block 418, after determining the link availability, the one or more processors 310 of the network controller 300 may send instructions to the nodes of the network 200 or 500 to improve network performance. Instructions may include implementation instructions for routing paths that avoid any unavailable links or restart instructions for a node that is unavailable and is located where a link is determined as available. In some implementations, the instructions may include using another type of link, such as a radiofrequency link or a fiber optic link, that is possible at a node of the network to form a redundant path to bolster network performance where link availability is determined to be low or unavailable. Further, the network controller may send messages to a second network to initiate one or more links to form a redundant path using one or more nodes in the second network where link available is determined to be low or unavailable. Where improved network performance includes greater available bandwidth, the network controller may also send a notification to one or more client devices or remote server devices regarding the available bandwidth.

In some alternatives, the network controller may send or store an indication of link availability when link availability is determined to be below a threshold availability. The threshold availability may be defined by one or more threshold metrics, including maximum attenuation rate, minimum bandwidth, etc. The indication may be accessed by one or more computing devices and used for network planning.

In other alternatives, link availability may be determined using reinforcement learning or other machine learning methods. To implement reinforcement learning, the neural network may determine or receive link performance metrics associated with a link for which it has determined an attenuation category. The link performance metrics may be for a point in time within a set amount of time after the attenuation category is determined. The link performance metrics may be used in association with the image and timestamp associated from which the attenuation category was determined to further train the neural network.

In further alternatives, the link availability may be determined for a candidate location where there is no existing node for the FSOC network, such as for planned node 510 or possible node 512 in FIG. 5. Images may be received from cameras installed where no node yet exists, and the trained neural network may output the attenuation category for each received image. Based on the attenuation categories for images from one or more cameras near a given candidate location, one or more processors may predict link performance at the given candidate location. In some examples, the one or more processors may predict the link performance using images that span months or years near the given candidate location. In other examples, the one or more processors may predict the link performance based further on historical data for the given candidate location, such as weather data. The one or more processors may then determine link availability for the candidate location based on the predicted link performance. Link availability may also be based on proximity to an existing node of the FSOC network.

The technology herein provides a way to gauge availability of an FSOC link at a location. The described method can be performed using existing cameras or off-the-shelf products, which may keep costs lower. In addition, the method may allow for more accurate predictions of latencies of links in an FSOC network and better plans to compensate for the latencies. As a result, the FSOC network may have increased speed and efficiency overall.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of operating a communication network that includes a plurality of nodes, the method comprising:
receiving, by one or more processors, first images and signal visibility data for first locations for one or more first nodes of the plurality of nodes;
generating, by the one or more processors, training data based on the first images and the signal visibility data;
training, by the one or more processors, a neural network using the training data, the neural network being configured to receive a training image and a timestamp for the training image and to output an attenuation category related to attenuation rate of a link received by the one or more first nodes;
receiving, by the one or more processors, second images for second locations for one or more second nodes of the plurality of nodes;
determining, by the one or more processors, link availability based on the second images and outputs from the neural network; and
operating, by the one or more processors, the communication network based on the link availability.

2. The method of claim 1, wherein one or more of the second locations are the same as one or more first locations.

3. The method of claim 1, wherein the attenuation category includes a good category and a poor category that are defined by one or more threshold attenuation rates.

4. The method of claim 3, wherein the good category is defined as an attenuation rate of the link that is less than or equal to a threshold rate.

5. The method of claim 4, wherein the poor category is defined as an attenuation rate of the link that is greater than the threshold rate.

6. The method of claim 3, wherein the good category and the poor category are also defined by link distance, link operating conditions, and link operating constraints.

7. The method of claim 1, further comprising receiving, by the one or more processors, additional dynamic data for conditions at the second locations;
wherein the determining of the link availability is further based on the additional dynamic data.

8. The method of claim 1, further comprising:
receiving, by the one or more processors, one or more third images from a candidate location for a new node;
predicting, by the one or more processors, link performance at the candidate location using outputs from the neural network using the one or more third images as input; and
determining, by the one or more processors, link availability for the candidate location based on the predicted link performance.

9. The method of claim 8, further comprising determining, by the one or more processors, the candidate location for the new node based on predicted availability of internet access at the candidate location.

10. A network controller for a plurality of nodes in a communication network, the network controller comprising:
a communications system configured to communicate with the plurality of nodes; and
one or more processors configured to:
receive one or more images for locations of interest for a communication link in the communication network;
implement a neural network to obtain an attenuation category for each of the one or more images, the neural network being trained to receive images and output an attenuation category related to attenuation rate of a link received at the locations of interest associated with the images;
determine link availability at the locations of interest based on the one or more images and outputs from the neural network; and
operate the communication network based on the link availability.

11. The network controller of claim 10, wherein the network controller further comprises the neural network.

12. The network controller of claim 10, wherein the attenuation category includes a good category and a poor category that are defined by one or more threshold attenuation rates.

13. The network controller of claim 12, wherein the good category is defined as an attenuation rate of the link that is less than or equal to a threshold rate.

14. The network controller of claim 13, wherein the poor category is defined as an attenuation rate of the link that is greater than the threshold rate.

15. The network controller of claim 12, wherein the good category and the poor category are also defined by link distance, link operating conditions, and link operating constraints.

16. The network controller of claim 10, wherein the one or more processors are further configured to receive additional dynamic data for conditions at the locations of interest;
wherein the link availability is determined further based on the additional dynamic data.

17. The network controller of claim 10, wherein the one or more processors are further configured to:
receive one or more second images from a candidate location for a new node;
predict link performance at the candidate location using outputs from the neural network using the one or more second images as input; and
determine link availability for the candidate location based on the predicted link performance.

18. The network controller of claim 17, wherein the one or more processors are further configured to determine the candidate location for the new node based on predicted availability of internet access at the candidate location.

19. A non-transitory, tangible computer-readable storage medium on which computer readable instructions of a program are stored, the instructions, when executed by one or more processors of a network controller, cause the one or more processors to perform a method, the method comprising:
receiving one or more images for locations of interest for a communication link in a communication network;
implementing a neural network to obtain an attenuation category for each of the one or more images, the neural network being trained to receive images and output an attenuation category related to attenuation rate of a link received at the locations of interest associated with the images;
determining link availability at the locations of interest based on the one or more images and outputs from the neural network; and
operating the communication network based on the link availability.

20. The storage medium of claim 19, wherein the method further comprises:

receiving training images and signal visibility data for locations of one or more nodes in the communication network;

generating training data based on the training images and the signal visibility data; and training a neural network using the training data, the neural network being configured to receive a training image and a timestamp for the training image and to output an attenuation category related to attenuation rate of a link received by the one or more nodes.

* * * * *